United States Patent [19]

Kashio

[11] 4,087,853
[45] May 2, 1978

[54] STORAGE RECONFIGURATION APPARATUS

[75] Inventor: Toshio Kashio, Tokyo, Japan

[73] Assignee: Casio Computer Co., Ltd., Tokyo, Japan

[21] Appl. No.: 724,622

[22] Filed: Sep. 20, 1976

Related U.S. Application Data

[63] Continuation of Ser. No. 525,103, Nov. 19, 1974, abandoned.

[30] Foreign Application Priority Data

Nov. 20, 1973 Japan .............................. 48-130421
Nov. 20, 1973 Japan .............................. 48-130423

[51] Int. Cl.$^2$ ........................................... G06F 13/00
[52] U.S. Cl. .................................................. 364/200
[58] Field of Search ............................ 364/200, 400

[56] References Cited

U.S. PATENT DOCUMENTS 3,911,404  10/1975  O'Neill, Jr. ................... 340/172.5

Primary Examiner—Gareth D. Shaw
Assistant Examiner—C. T. Bartz
Attorney, Agent, or Firm—Flynn & Frishauf

[57] ABSTRACT

An information transmission-controlling apparatus which comprises a memory for storing a series of words each formed of a plurality of binary coded characters; an information input device for supplying the memory device with a numeral-type word or a letter-type word consisting of a larger maximum character bit number than that of a numeral-type word and a word-positioning code interposed between the respective words; and a word character bit number-designating device for determining the character bit number of words supplied from the information input device according to whether the words are of a numeral type or a letter-type, upon detection of that word-positioning code delivered from the information input device which precedes each of both types of words, in order that each word can be stored in the memory device with the corresponding selected character bit number.

5 Claims, 7 Drawing Figures

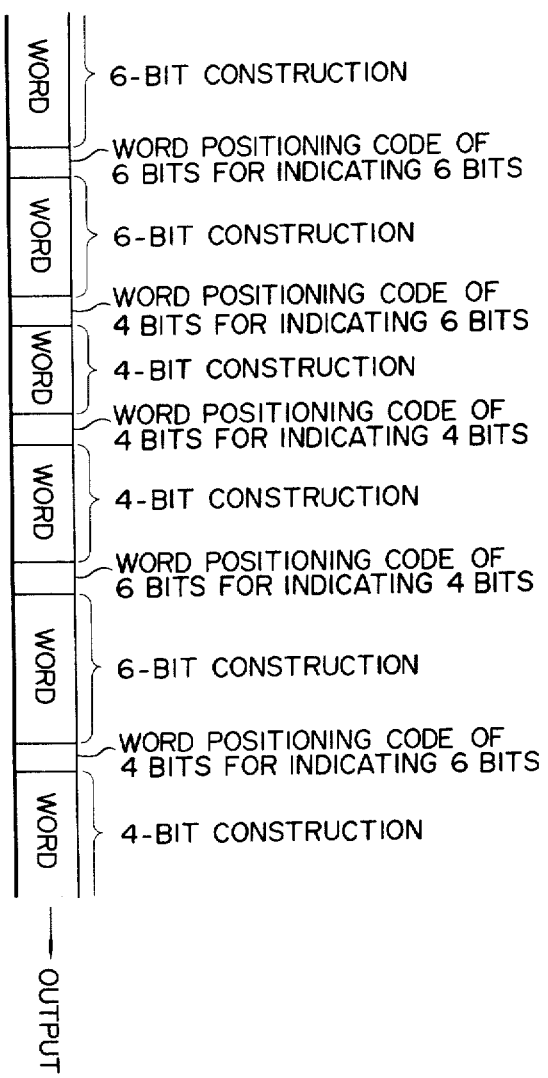

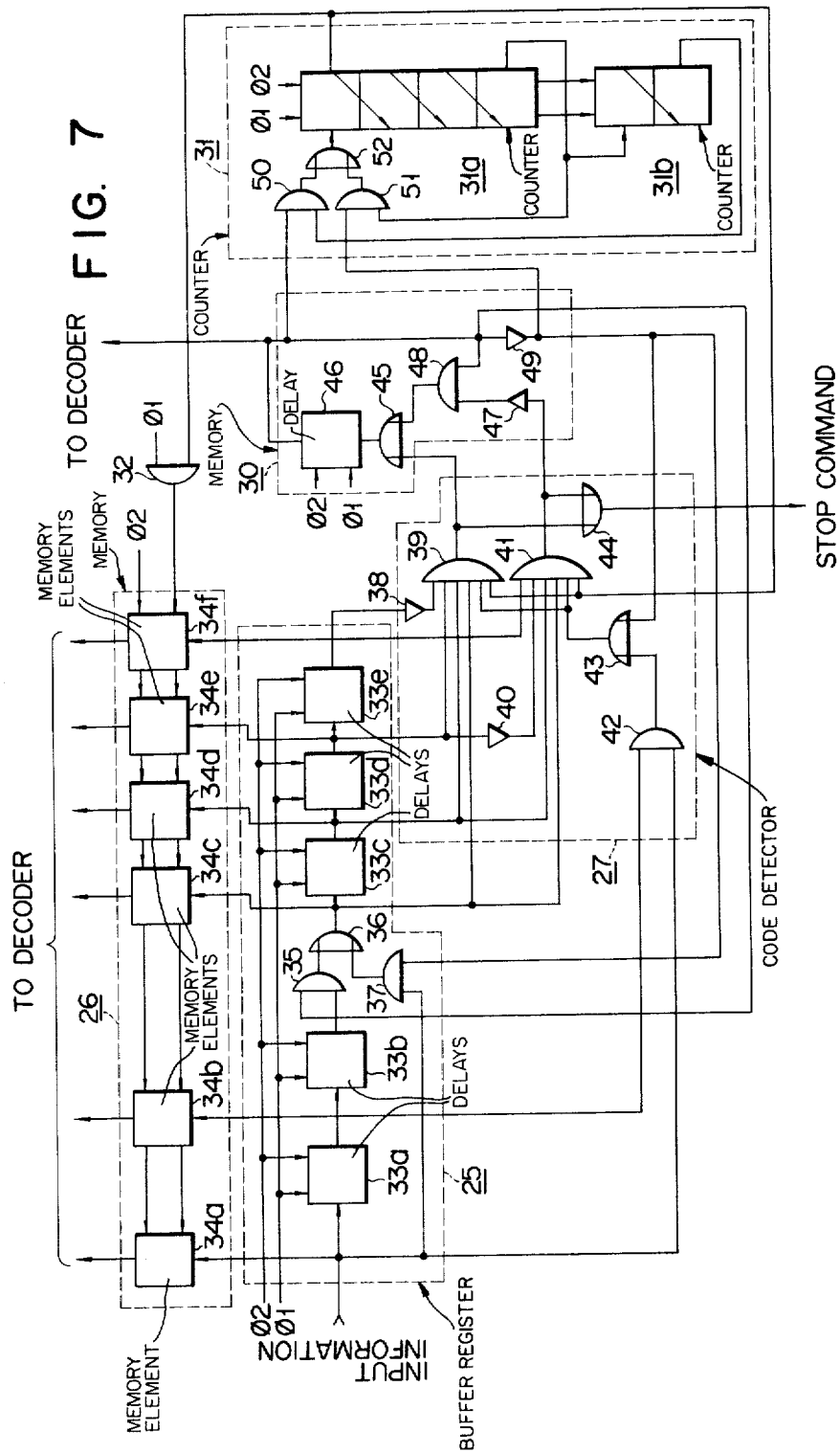

STORAGE RECONFIGURATION APPARATUS

This is a continuation of application Ser. No. 525,103, filed Nov. 19, 1974, now abandoned.

BACKGROUND OF THE INVENTION

This invention relates to an information transmission-controlling apparatus which can decrease the number of bits of characters constituting each word, thereby enabling a memory device to serve the purpose with a smaller capacity than otherwise required.

Generally, information consists of a series of words each containing one or more characters. The individual characters of each word are designated by a specified number of bits. For example, where each word included in the information appearing in an ordinary business handling bill contains a combination of numerals and letters, for example, of the alphabet, the the character bit number of the word is determined by a maximum bit number among those of the individual characters of said word. Customarily, a numeral is designated by four bits and a letter, for example, of the alphabet is denoted by six bits. Where, therefore, serially arranged words included in a given piece of information are each formed of a combination of numerals and, for example, alphabetical letter, then, the bit number of the word is regarded as being represented by six bits designating the alphabetical letter. In this state, information has hitherto been transmitted to an arithmetical processing device.

Namely, even where the greater part of a piece of information only consists of numerals, it has been necessary to designate the characters of all the words by six bits which actually need not be so designated. Hitherto, therefore, information has been transmitted to an arithmetic processing device in a state containing a large number of bits which can actually be eliminated.

Handling, for example, arithmetic operation or recording, of the individual items of information requires them to be stored in series in an arithmetic operation register or any other type of register. However, any type of register is naturally limited in a memory capacity and yet is demanded to store as much information as possible. On the other hand, acceleration of various forms of information-handling can obviously be effectively attained if information contains as small a number of bits as possible which should be read out.

SUMMARY OF THE INVENTION

This invention has been accomplished in view of the above-mentioned circumstances and is intended to provide an information transmission-controlling apparatus which enables the binary coded individual characters of words constituting a piece of inforamtion being supplied and read out to be designated by as small a number of bits as possible, thereby smoothly and quickly effecting various forms of information-handling and consequently reducing the required storing capacity of memory device such as different types of register used.

The above-mentioned object of this invention is attained by the operations described below. To this and, the information transmission-controlling appratus of this invention comprises a memory device which is stored with a series of words delivered from an information input device upon key depression, each of which is formed of a plurality of binary coded characters, with the adjacent words separated by an intervening word-positioning code; and a character bit number-designating device which is operated under control of a word-positioning code signal sent forth from the information input device and determines a bit number of the respective characters of a word to be stored in the memory device from the information input device, according to whether the word is of a numeral type or a letter type. The character bit number-designating device has a sufficient capacity to store all digits according to the number of columns of the bill, the number of which varies with the type of bill. Said character bit number-designating device comprises a counter and a static shift register stored with a program designating a character bit number among the respective character of each word recorded in the successive columns. When supplied with a word-positioning code signal, the character bit number-designating device produces an output specified by the type of word, that is, according to whether the word is of a numeral type or a letter type, in pursuance of the program already set. At this time, the counter gives a count corresponding to the aforesaid output, thereby designating a character bit number among the respective characters of each word appearing in the successive columns when the word is supplied from the information input device.

The issue of a specified output from the counter is effected by detecting a difference between the bit arrangements of the word-positioning codes preceding the respective words, storing said difference in the memory device, and reading out a count-instructing signal from said memory device.

The words whose character bit numbers have been determined by the character bit number-designating device are stored in series in a main memory device and later read out therefrom. The read out information is impressed by a printing device.

BRIEF DESCRIPTION OF THE DRAWINGS:

FIG. 6 sets forth the character bit arrangement of successive words separated by an intervening word-positioning code in the embodiment of FIG. 5; and FIG. 7 is concrete circuit arrangement of the information output section of the embodiment of FIG. 5.

DESCRIPTION OF THE PREFERRED EMBODIMENTS

There will now be described an embodiment of the invention by reference to the appended drawings.

Figure 1:
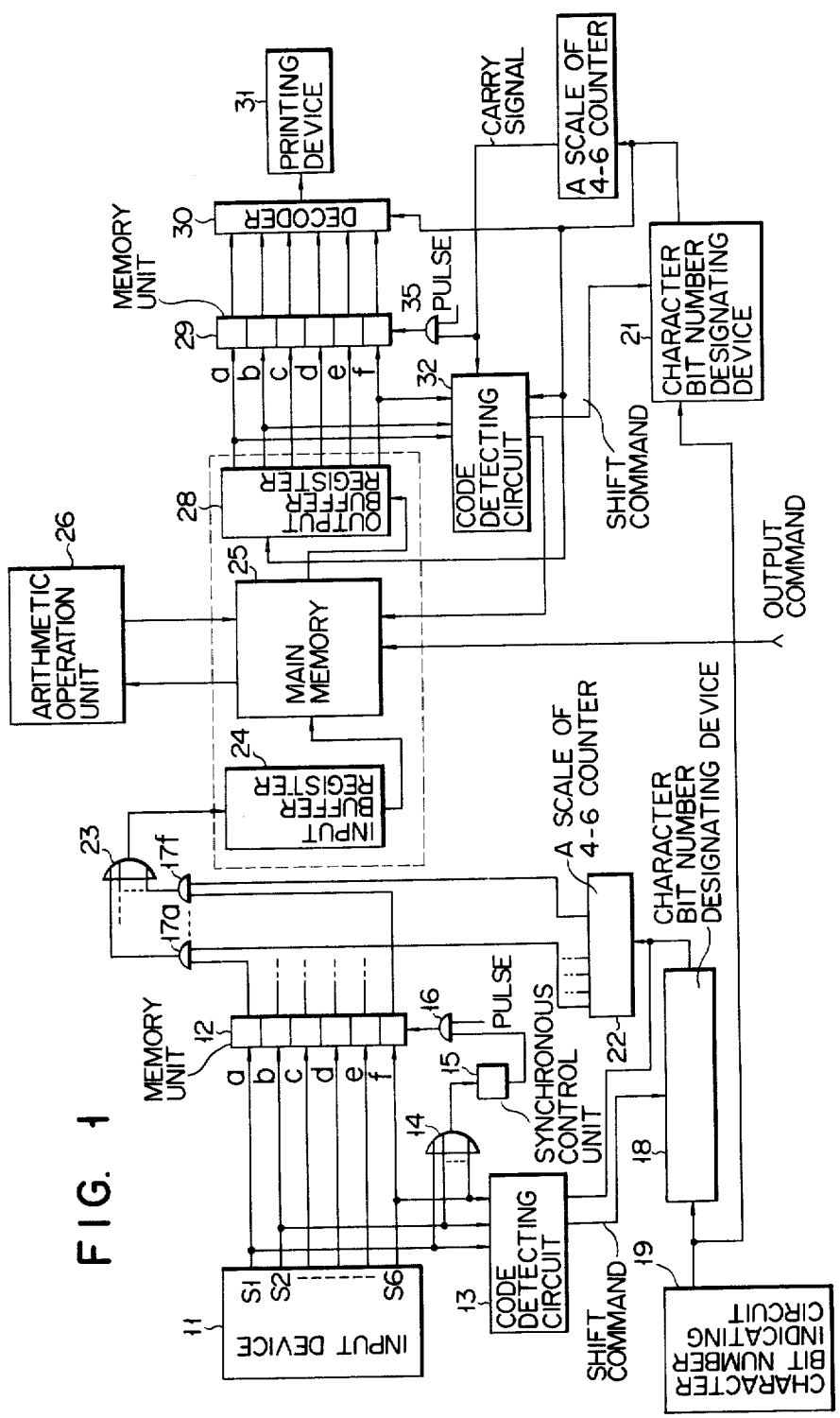
FIG. 1 is a block circuit diagram showing an embodiment of this invention.

Referring to FIG. 1 showing an embodiment of the invention, referential numeral 11 denotes an information input device comprising a manual device provided with, for example, a keyboard or an automatic device using, for example, a perforated type, and an encoder for codifying the characters of words supplied to the subject information transmission-controlling apparatus. The information device 11 draws out, for example, a six-bit signal from lines $S_1$ to $S_6$. If, in this case, a word received is of a numeral type, the respective characters of said word are denoted by 4 bits, using the lines $S_1$ to $S_4$, and two bits corresponding to the remaining two lines $S_5$, $S_6$ are codified as "0". Where a word received is of a letter type, the word is designated by six bits as a whole, using the lines $S_1$ to $S_6$.

Words delivered from the information input device 11 are arranged in series and separated by an intervening positioning code such as a tabset code corresponding to the respective columns of, for example, a bill. Read out bit signals corresponding to the lines $S_2$ to $S_6$ are stored in a memory unit 12 formed of six 1-digit type flip-flop circuits $a$ to $f$, and also delivered to a word positioning code-detecting circuit 13. This word positioning code-detecting circuit 13 gives forth a detection output when the input device 11 generates a word-positioning code, the bits of which are all codes as, for example, "1". Bit signals corresponding to the lines $S_1$ to $S_6$ are conducted to an OR circuit 14, which produces an output when a bit corresponding to any of the lines $S_1$ to $S_6$ denotes "1", namely, when a word in supplied from the information input device 11 to either of the gates of said OR circuit 14. Upon receipt of said output from the OR circuit 14, a synchronous control circuit 15 is operated to supply a gating signal to one of the gates of an AND circuit 16. When supplied with an operation pulse at the other gate, the AND circuit 16 sends forth an output, which in turn is conducted to the aforesaid memory unit 12 to read out the contents of the flip-flop circuits $a$ to $f$. Outputs from these flip-flop circuits $a$ to $f$ are transmitted to the corresponding AND circuits 17$a$ to 17$f$.

The information input device 11 is provided with a character bit number-designating device 18 for designating a bit number among the respective characters of each of the successive words and programming said words in the binary coded form. This character bit number-designating device 18 is formed of a static shift register having a sufficient capacity to store all digits (including word-positioning cordes, letter and other notation) recorded in the successive columns of a bill. Successively programmed in said character bit number-designating device 18 are the bit numbers of the characters of each word to be recorded in the columns of a bill in the binary coded form by means of a character bit number-indicating circuit 19. In case a character is denoted by four bits, then this bit number is coded as "1", and where a character is designated by six bits, then this bit number is coded as "0". Each time the word positioning code-detecting circuit 13 gives forth a code detection signal, a 1-digit shift takes place in the character bit number-designating device 18, causing the content of the program to be read out one digit after another from the output terminal of said device 18.

When a character appearing in the first column of a bill is formed of a letter or letters or together with numerals, the character bit number of the word of the first column is designated by six bits allotted to each letter included in said word. Therefore, a code signal "0" denoting six bits is stored in the character bit number-designating device 18 corresponding to the first column. Where the word of the second column indicates an amount only consisting of numerals, then the character bit number of said word is indicated by four bits. In this case, a code signal "1" representing four bits is stored in the character bit number-designating device 18 corresponding to the second column.

The subject information transmission-controlling apparatus further comprises another character bit number-designating device 21 for transmitting information to the following arithmetic processing device. This character bit number-designating device 21 is also stored with the same type of program as previously described by means of the character bit number-indicating circuit 19. Where the input and output of information of said character bit number-designating devices 18, 21 are not carried out at the same time, either of them maybe used in common.

A four-bit or six-bit output from the character bit number-designating device 18 is supplied to the word positioning code-detecting circuit 13 as a reset signal for the detected word-positioning code signal and also to a counter 22 of, for example, a ring type which is advance in counting upon receipt of suitable clock pulse, for example, a signal instructing an advance of four or six bits. An output from the counter 22 is delivered to one of the gates of the respective AND gates 17$a$ to 17$f$, causing the bit numbers already stored in the memory unit 12 to be successively read out through the AND curcuits 17$a$ to 17$f$ and OR circuit 23 and then again stored in an input buffer register 24 and further in a main memory 25. A suitable arithmetic operation device 26 is provided for the main memory 25 to carry out arithmetic operation. When supplied with an output command, this arithmetic operation device 26 reads out the character bit numbers of the respective words stored in the main memory 25 to an output buffer register 28. The bit numbers of the respective characters of each word read out from the output buffer register 28 are supplied to the corresponding registers $a$ to $f$ of the memory unit 29. The output bit signals from the memory unit 29 are delivered for impression to an output device, for example, a printing device 31 through a decoder 30. Output bit signals from the output buffer register 28 are supplied to a word positioning code-detecting circuit 32. When detecting said word-positioning code, the detecting circuit 32 generates an output which causes shifting to take place in the character bit number-designating device 21. A four- or six-bit instructing output from said designating device 21 is conducted as a reset signal to the word positioning code-detecting circuit 32 and also delivered as a character bit number instructing signal to the decoder 30. The four- or six-bit signal is further supplied to a counter 35 as an instruction to count four or six bits. A carry signal from the counter 34 is sent to the word positioning code-detecting circuit 32 as a pulse instructing to read out a code and also to an AND circuit 35 as a gating signal. Each time the AND circuit 35 is supplied with said pulse signal, a word stored in the memory unit 29 is read out.

Figure 2:
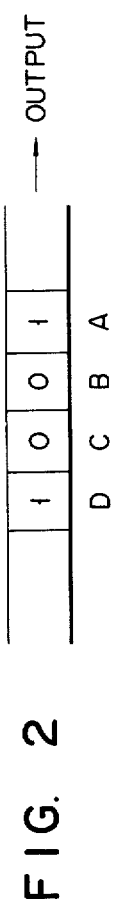
FIG. 2 shows the programmed condition of the binary coded characters of a word in the character bit number-designating device of FIG. 1.

Where, in the subject information transmission-controlling apparatus arranged as described above, it is assumed that the character bit number-designating devices 18, 21 are each stored with a program of, for example, words A, B, C, D by the bit number-instructing circuit 19 as illustrated in FIG. 2, then an information input operation is carried out in the following manner. Where the input device 11 is supplied with information, for example, by manually operating a keyboard, six bit signals are given forth from the terminals $S_1$ to $S_6$ for each character when a key is depressed, and temporarily stored in the memory unit 12. When, in this case, the word supplied is of a numeral type, then the respective characters of the word are designated as four bits corresponding to the terminals $S_1$ to $S_4$. The output bit signals from the remaining terminals $S_5$, $S_6$ are coded as "0".

In the case of a word-positioning code, however, six bits which are each codified as "1" are given forth from the terminals $S_1$ to $S_6$.

When the information input device 11 receives, for example, the word of the column A of FIG. 2, then the bit number-instructing signal "1" corresponding to the word of the column A which has already been programmed in the character bit number-designating device 18 is read out upon receipt of a shift command from the word positioning code-detecting circuit 13 and supplied to the counter 22 as an instruction to count up four bits. The advanced counting of the counter 22 causes a gating signal to be conducted to the AND circuits 17a to 17d in turn which are positioned on the output side of the registers a to d corresponding to the four bits stored in the memory unit 12. Output signals from the AND circuits 17a to 17d are carried as four-bit information to the input buffer register 24 through the OR circuit 23. In this case, it is advised to supply a pulse to the AND circuit 16, each time a carry signal is issued from the counter 22 and operate the memory unit 12 by an output from said AND circuit 16. When a supply of the word of the column A, whose characters or numerals are denoted by four bits or a code "1" is brought to an end, from the input device 11 sends forth a word-positioning code, for example, by tabsetting. This word-positioning code which is also formed of four bits like the respective characters of the word of the column A is delivered to the input buffer register 24. An output from the word positioning code-detecting circuit 13 which denotes the detected word-positioning code advances counting in the character bit number-designating device 18, which in turn supplied the counter 22 with a signal showing the code "0" representing the character bit number of the word of the succeeding column B, causing the counter 22 to count six bits. A six-bit output from the counter 22 corresponding to the above-mentioned code "0" is supplied to the input buffer register 24.

Figure 3:
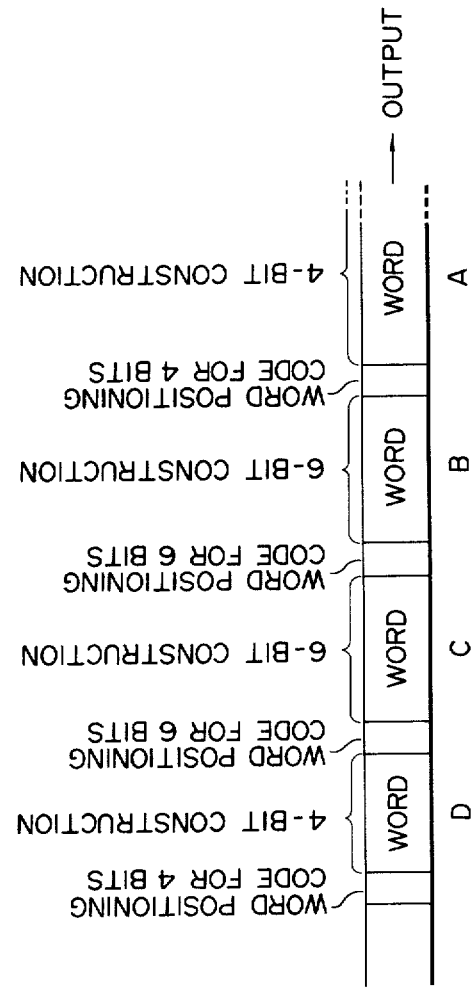
FIG. 3 illustrates the character bit arrangement of successive words separated by an intervening word-positioning code in the embodiment of FIG. 1.

The character bit number arrangement of words programmed in the character bit number-designating device 18 as shown in FIG. 2 and stored in the main memory 25 through the input buffer 24 presents the pattern of FIG. 3.

When an output command is given to the main memory 25, a bit signal of the respective characters of each word is read out to an output buffer register 28, and thereafter delivered to the decoder 30 through the memory unit 29. An output produced by the decoder 30 upon receipt of an output from the character bit number-designating device 21 is sent forth to the printing device 31 to carry out desired impression. A word-positioning code interposed between the adjacent words and read out from the output buffer register 28 is detected by the word positioning code-detecting circuit 32, a detection output from which is supplied as a shift command to the character bit number-designating device 21. A word-positioning code signal delivered from said detecting circuit 32 is also carried to the main memory 25, and prevents the character bit signals of each word from being read out from the main memory 25 to the output buffer register 28. Upon receipt of a shift command, the character bit number-designating device 21 gives forth a four bits-instructing, namely, "1" output or six bits-instructing, namely, "0" output to the counter 34. According to the content of a program stored in said device 21. An output carry signal from the counter 34 which represents four or six bits is conducted to the word positioning code-detecting circuit 32 to expel the aforesaid shift command. As mentioned above, the character bit number-designating device 21 is stored with a program showing the bit numbers (codified as "1" or "0") of the respective characters of each word included in the information supplied. A word-positioning code detected by the word positioning code-detecting circuit 32 is supplied as a shift command to said character bit number-designating device 21. The decoder 30 generates an output corresponding to a four bit- or six bit-instructing output from the character bit number-designating device 21, thereby causing the printing device 31 to carry out impression.

There will now be described by reference to FIG. 4 the arrangement of a printing output device. Records read out from the main memory 25 are successively supplied to serially arranged delay circuits 36a, 36b consisting of delayed flip-flop circuits operated by clock pulses $\phi_1, \phi_2$. An output from the delay circuit 36b is conducted through serially arranged delay circuits 36c, 36d, 36e consisting of the same type of delayed flip-flop circuit as described above through an AND circuit 37 and OR circuit 38 in turn. When an AND circuit 37 is supplied with a gating signal denoting a four-bit-instructing, namely, "1" output or six bit-instructing, namely, "0" output from the character bit-designating device 21, then the delay circuits 36a to 36e are connected in series to be respectively stored with a one bit signal. Part of input information is supplied to a one-bit memory element 39a, for example, of flip-flop type, and the output terminals of delay circuits 36a to 36e are connected to the corresponding one-bit memory elements 39b to 39f similarly of flip-flop type. Bit signals from said memory elements 39a to 39f are carried to the character bit signal decoder 30. The character bit signals of each word are also supplied to an OR circuit 38 through an AND circuit 40. Both AND circuit 40 and AND circuit 37 are gated by a four bit- or six bit-instructing signal sent forth from the character bit number-designating device 21. A four bit-instructing, namely, "1" output from the character bit number-designating device 21 is supplied as a gating signal to the AND circuit 40. Said four bit-instructing signal is conducted through said AND circuit 40 and OR circuit 38 to the delay circuits 36c to 36e in turn. Upon receipt of a read out command, the OR circuit 38 and delay circuit 36c to 36e give forth outputs, which are temporarily stored in the corresponding memory units 39c to 39f. A four-bit signal stored in said memory units 39c to 39f is sent forth from the decoder 30 for printing.

A six-bit, namely, "0" output from the character bit number-designating device 21 is supplied as a gating signal to the AND circuit 37 through an inverter 41. An output from said main memory 25 is conducted through the delay circuits 36a, 36b, AND circuit 37, OR circuit 38 and delay circuits 36c to 36e in turn. The six-bit signal thus supplied is carried through the delay circuits 39a, 39b and, 39c to 39f. After temporarily stored in these delay circuits, the six-bit signals are read out from the decoder 30 upon receipt of a read out command to be read for printing.

The delay circuits 36a, 36b, AND circuits 37, 40, OR circuit 38 and delay circuits 36c to 36e correspond to the output buffer register 28 of FIG. 1. The delay circuits 39a to 39f corresponding to the memory unit 29. Bit signals from the output buffer register 28 are also supplied to the word-positioning code-detecting circuit 32. The word positioning code-detecting circuit 32 is formed of an AND circuit 42, AND circuit 43 generating a gating signal to said AND circuit 42 through OR circuit 44 disposed between said AND circuits 42, 43. The gates of the AND circuit 42 are supplied with outputs from the OR circuit 38, the delay circuits 36c to 36e, an output delivered from the AND circuit 43 through OR circuit 44 and a carry signal sent forth from the counter 34. The gates of the AND circuit 43 are supplied with the character bit signals of each word, an output from the delay circuit 36a. The other gate of the OR circuit 44 is supplied with a four bit-instructing, namely, "1" output from the character bit number-designating device 21. When all the gates of the AND circuit 42 are supplied with outputs, then the word positioning code-detecting circuit 32 generates a shift command to the character bit number-designating device 21. The counter 34 consists of a first four-scale counter 45 provided with four one-bit delay circuits each operated, for example, by clock pulses $\phi_1, \phi_2$ and a second two-bit counter 46 provided with two one-bit delay circuits each operated, for example, by clock pulses $\phi_1, \phi_2$. A four bit-instructing namely, "1" output from the character bit number-designating device 21 is carried to the first four-bit counter 45 through an AND gate 47 and OR circuit 49. A feedback circuit including said first counter 45 is formed of the AND circuit 47 and OR circuit 49. A six bit-instructing, namely, "0" output from the character bit number-designating device 21 is conducted to a six-bit counter consisting of the first-four-bit counter 45 and second two-bit counter 46, through the AND circuit 48 and OR circuit 49. The AND circuit 28, OR circuit 49 and six-bit counter constitute a feedback circuit.

The counter 34 issues a carry signal corresponding to a count selected by a character bit number-instructing input signal. The issue of said selected carry signal controls the supply of a shift command to the word positioning code 32. Said carry signal is also delivered to the memory unit 29 through the AND circuit 35, to control read out a signal from the memory unit 29 to the decoder 30.

Figure 4:
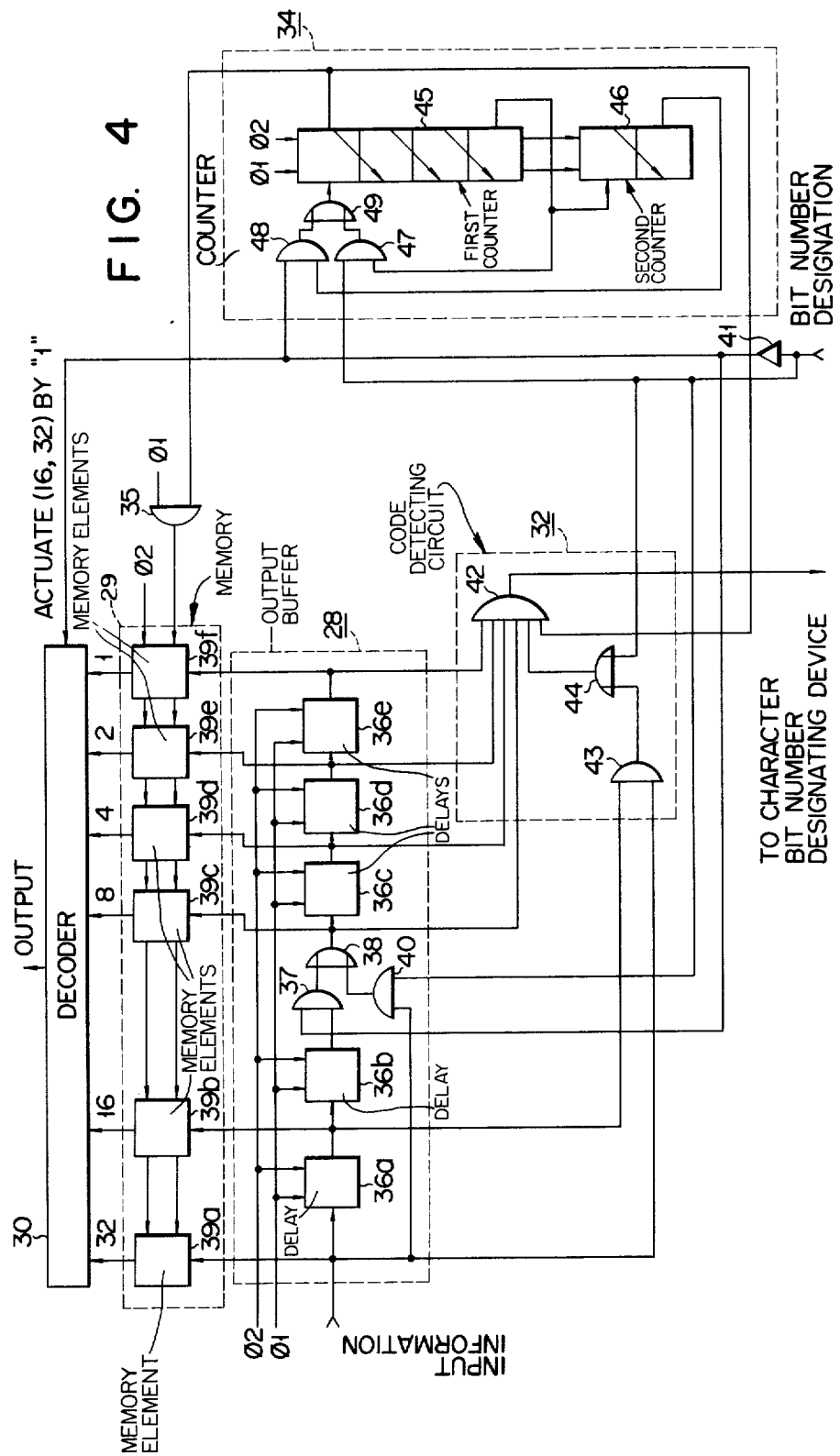
FIG. 4 is a circuit arrangement of the information output section of the embodiment of FIG. 1.

When, in the read out system of FIG. 4, a selected word positioning code coded as "1111" is read out from the main memory 25 to the output buffer register 28, and, in this case, the character bit number-designating device 21 is stored with a four-bit code "1", then the gate of the AND circuit 40 is opened upon receipt of a shift command, and the memory elements 39c to 39f of the memory unit 29 are operated. As the result, a four-bit signal of a numeral is delivered from the decoder 36 to impress a numeral-type word. When the output buffer register 28 is supplied with a selected word positioning code coded as "111111", and, in this case, the character bit number designating device 21 in stored with the six-bit code, namely, "0" of a letter-type word, then the gate of the AND circuit 37 is opened upon receipt of a shift command, and the memory elements 39a to 39e are operated. As the result, a six-bit signal of a letter is issued through the decoder 30 to impress a letter-type word.

As mentioned above, the foregoing embodiment defines a bit number according to the content of each word, and in consequence reduces the bit number of an entire piece of information.

Therefore, said embodiment not only enables the capability of a memory device used with various forms of information-handling apparatus to be utilized with high efficiency, but also displays a prominent effect in controllably the input and output of information. Further, where a memory device uses a perforated tape or a plurality of parallel arranged register and bit signals in the parallel form, then the memory device can be stored with bit signals in higher density, namely, with the occurrency of wasteful memory spaces more effectively decreased than in the prior art information-transmission apparatus, if bit signals arranged in parallel crossive if, for example, a tape are read out in succession. Where the respective characters of each word are designated by four or six bits as in the aforesaid embodiment, and four bits are linearly arranged crosswise of a perforated tape, then two characters each represented by six bits can be recorded in three four-bit crosswise lines, thus attaining the miniaturization of the above-mentioned type of information input and output device.

The foregoing description relates to the embodiment in which a numeral-type word was designated by four bits and a letter-type word was denoted by six bits. However, the bit number of the respective characters of each word can be freely selected according to its content. Further, this invention is not limited to the above-mentioned combination of two character bit numbers, but may also be applicable to information whose words consist of character represented by many different bit numbers.

There will now be described by reference to FIG. 5 another embodiment of this invention in which the bit number of the respective characters of each word included in input information is determined by detecting a difference between the bit arrangements of the word-positioning codes preceding the respective words and determining the character bit number of each word from a detection output showing said difference.

Figure 5:
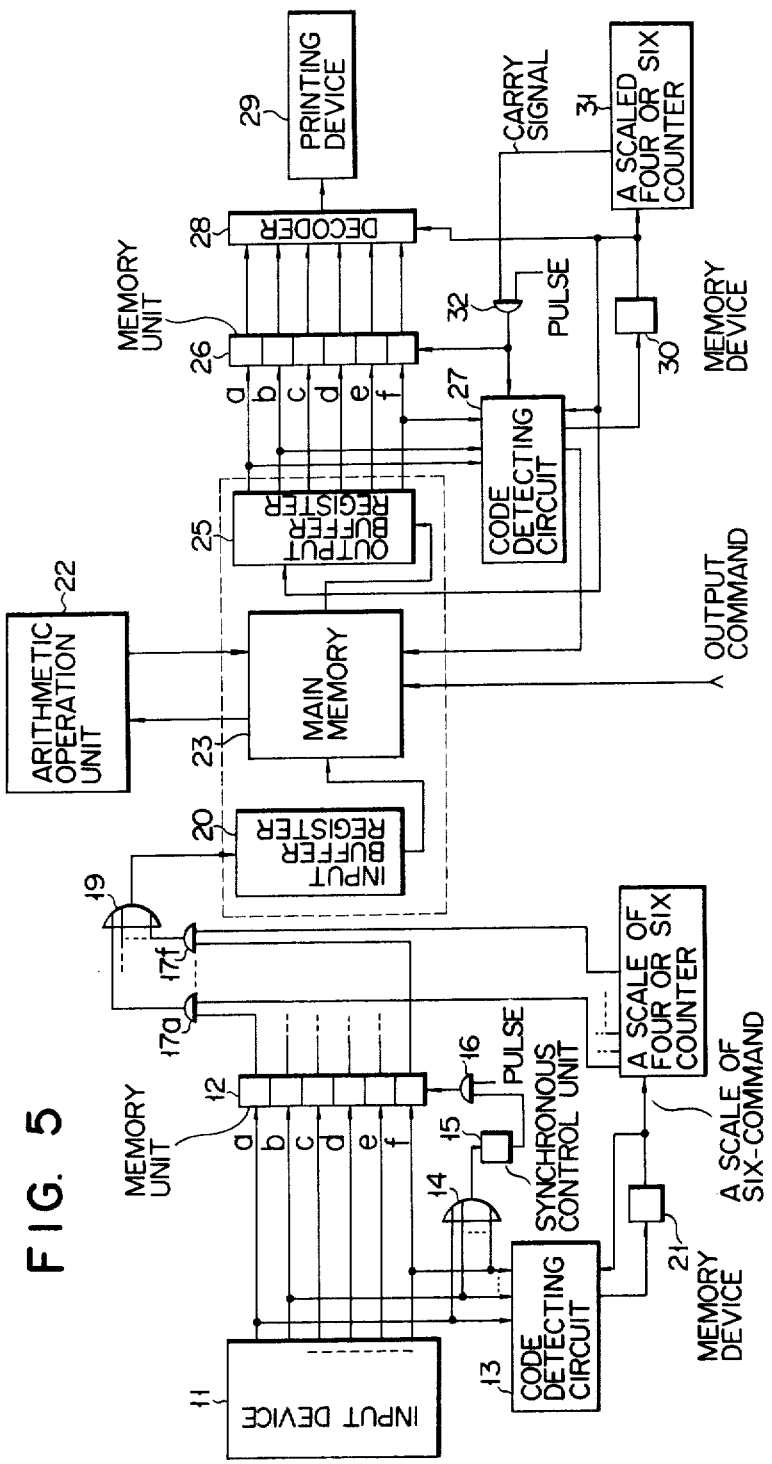
FIG. 5 is a block circuit diagram of another embodiment of the invention.

FIG. 5 illustrates the circuit arrangement of the second embodiment. The information input device 11 is provided with, for example, a keyboard to supply information manually. The information input device 11 has, for example, six output terminals $S_1$ to $S_6$, causing six-bit signals to be read out from said terminals for each character. The bit number of the respective characters of each word included in output information is determined by the specified bit arrangement of a word-positioning code corresponding to, for example, tabsetting operation. Where a word being supplied to the subject information transmission-controlling apparatus is of a numeral type and the respective characters are transmitted to a separately provided arithmetic processing device, from the four-bit designation of the respective characters is carried out by a word. Positioning code preceding the corresponding word, and the four-bit signal of the respective characters of said word are read out from the output terminals $S_1$ to $S_4$. Where a word included in input information is of a letter-type and a letter is designated by six bits, then said six-bit designation is carried out by a word positioning code preceding the corresponding word, and the six-bit signal of a letter is read out from the output terminals $S_1$ to $S_6$. There will now be described the character bit arrangements of the respective words shown in FIG. 6. After a word having a character bit number of 4 is read out, a four-bit positioning code is supplied to indicate that the succeeding word has a character bit number of 6. After a word having a character bit number of 6 is read out, a six-bit positioning code is supplied to indicate that the succeeding word has a character bit number of 4. Namely, each word-positioning code is formed of the same number of character bits as those of the character bit number of the preceding word. Further, the bits of each word-positioning code include those which distinguish the character bit number of the succeeding word. The last two of the bits representing each positioning code are used in distinguishing the character bit number of the succeeding word. For example, where a four-bit word-positioning code succeeding to a four-bit word indicates that a word following said word-positioning code has a character bit number of 4, then said word-positioning code has a bit arrangement of "1101", the last two "10" of which are used is distinguishing the four-bit construction of a word following said word-positioning code. Where a six-bit word-positioning code succeeding to a six-bit word indicates that a word following said word-positioning code has a character bit number of 4, then said word-positioning code has a bit arrangement of "111101", the last two "01" of which are used in denoting the four-bit construction of a word following said word-positioning code. When a four-bit word-positioning code succeeding to a four-bit word indicates that a word following said positioning code has a character bit number of 6, then said word-positioning code has a bit arrangement of "1110", the last two "10" of which are used the distinguishing the six-bit construction of a word following said word-positioning code. Where a six-bit word positioning code succeeding to a six-bit word indicates that a word following said word-positioning code has a character bit number of 6, then said word-positioning code has a bit arrangement of "111110", the last two "10" of which are used in distinguishing the six-bit construction of a word following said word-positioning code. As described above, the last two "01" or "10" of the bits designating a word-positioning code indicate the character bit number of a word following said word-positioning code.

In the above-mentioned information input device, bit signals sent forth from the output terminals $S_1$ to $S_6$ are stored in the memory unit 12 consisting of memory elements $a$ to $f$ and are also conducted to the word-positioning code-detecting circuit 13. The bit signals are drawn out as input detection signals through the OR circuit 14, and supplied as a gating signal to the AND circuit 16 through the synchronous control unit 15. The content of the memory unit 12 is read out, each time a clock pulse is supplied to the AND circuit 16. Bit signals from the memory elements $a$ to $f$ are delivered to the AND circuits 17a to 17f respectively, which are gated according to a count made by the counter 18 formed of, for example, a ring counter, outputs from the AND circuit 17a to 17f are carried in series to the input buffer register 20 through the OR circuit 19.

The counter 18 is selectively set at a four- or six-scale. This setting is effected by that difference between the bit arrangements of adjacent word-positioning codes which is detected by the word positioning code-detecting circuit 13. This word-positioning code-detecting circuit 13 detects a word positioning code from the information delivered through the input device 11 and distinguishes the last two of the bits representing said word positioning code, said produces an output "1" when finding that said positioning code indicates that a word following said positioning code has a character bit number of 6. A detection signal denoting a word-positioning code is stored in the memory device 21, an output from which causes the counter 18 to count four or six bits.

Referring to FIG. 5, information stored in the input buffer register 20 is transmitted to an information-processing device comprising, for example, a main memory 23 provided with an arithmetic operation unit 22. Upon receipt of a read out command, the bit signal of each character is read out from this main memory 23 and stored in an output buffer register 25. Bit signals sent forth from the output buffer register 25 and stored in a memory unit 26 and are also conducted to a word positioning code-detecting circuit 27. An output from the memory unit 26 is carried through a decoder 28 to an output device, such as a printing device 29.

The above-mentioned word positioning code-detecting circuit 27 detects a word-positioning code from the information read out from the output buffer register 25 and distinguishes, as in the information input system, that portion of the bits representing said word-positioning code which indicates the character bit number of a word following said word-positioning code, and allows the bit signals of the respective characters of a word to be read out from the main memory 23, while giving a command to prevent the bit signals of the respective characters of the succeeding word from being read out from said main memory 23. An output from the word positioning code-detecting circuit 27 showing that portion of the bits denoting a word positioning code which indicates the character bit number of a word following said word positioning code is stored in a memory 30. A counter circuit 31 counts four or six bits according to an output from said memory 30. An output from said memory 30 informs the word positioning code-detecting circuit 27 of the bit number of a word-positioning code being read out next time, and gives the decoder 28 an instruction to read out a specified bit number. An output carry signal from the counter circuit 31 opens one gate of the AND circuit 32 which is supplied with a clock pulse to the other gate. An output pulse signal from the AND circuit 32 is supplied as a read out instruction to the word positioning code-detecting circuit 27 and memory unit 26.

According to the second embodiment arranged as described above, the last two of the bits designating a word-positioning code detected from the information supplied through the input device 11 indicate the character bit number of a word following said word-positioning code, causing the counter 18 to count four or six bits. Where the last two of the bits of the word-positioning code indicate that a word following said word-positioning code has a character bit number of 4, then the counter 18 counts four bits, causing the gates of the AND circuits 17a to 17d to be opened accordingly. Therefore, the four bits of the respective characters of a word following the above-mentioned word-positioning code which are stored in the memory unit 12 are read out in series to be stored in the input buffer register 20 and then in the main memory 23. When an output, the bit signals of the respective characters of words stored in series in the main memory 23 are read out therefrom to the output buffer register 25. In this case, the word positioning code-detecting circuit 27 detects a word-positioning code from an output of the output buffer register 25, preventing any further bit signals from being read out from the main memory 23. Therefore, the bit signals of characters can be read out exactly for each word.

In the above-mentioned output condition, the word positioning code-detecting circuit 27 detects a word-positioning code preceding a word whose character bit signal is to be read out next time. Detection of said word-positioning code causes the counter circuit 31 to count four or six bits. When the counter circuit 31 gives forth a carry signal, a read out command is given to the memory unit 26, effectively supplying a specified character bit number to the decoder 28.

FIG. 7 is a concrete circuit arrangement of the output section of the information transmission-controlling apparatus of this invention. The output buffer register 25 comprises serially arranged delay circuits 33a to 33e formed of, for example, delayed flip-flop circuits. The bit signals of the respective characters of word read out from the main memory 23 are supplied to the delay circuit 33a disposed at one end of the output buffer register 25. The delay circuits 33a to 33e are designed to be supplied with information upon receipt of a clock pulse $\phi_1$ and send forth information upon receipt of a clock pulse $\phi_2$. An information input terminal and the output terminals of the delay circuits 33a to 33e are connected to the one-bit memory elements 34a to 34f. These memory elements 34a to 34f collectively constitute the memory unit 26. Information is stored therein upon receipt of a clock pulse from the AND circuit 32 and read out therefrom upon receipt of a carry signal from the later described counter circuit 31. Bit siganls read out from the memory elements 34a to 34f are sent forth to a decoder (not shown). An AND circuit 35 and OR circuit 36 are provided between the delay circuits 33b and 33c of the output buffer register 25. The OR circuit 36 is connected to the output terminal of an AND circuit 37 supplied with input information. When, therefore, the corresponding gate of the AND circuit 39 is opened, input information does not pass through the delay circuits 33a, 33b, but is directly supplied to the delay circuit 33c. The output terminals of the delay circuits 33c, 33d, the output terminal of the delay circuit 33e (through an inverter 38) and the input terminal of the delay circuit 33c are connected to the corresponding gates of an AND circuit 39. The output terminals of the delay circuits 33c, 33e, the output terminal of the delay circuit 33d (through an inverter 40) and the input terminal of the delay circuit 33c are connected to the corresponding gates of an AND circuit 41. The information input terminal and the output terminal of the delay circuit 33a are connected to an AND circuit 42, an output from which is carried to one of the gates of the AND circuits 39, 41 respectively through an OR circuit 43. Another of the gates of said AND circuits 39, 41 respectively is supplied with a carry signal sent forth from the counter circuit 31. A section including the AND circuits 39, 41 constitute the word positioning code-detecting circuit 27. Namely, outputs delivered from the AND circuits 39, 41 through an OR circuit 44 are used as word positioning code-detecting signals. An output from the AND circuit 39 represents that portion of the bits denoting a word positioning code which indicates that a word following said word positioning code has a character bit number of 6. An output from the AND circuit 41 represents that portion of the bits denoting a word positioning code which indicates that a word following said word positioning code has a character bit number of 4. Further, said outputs from the AND circuits 39, 41 are supplied as a stop command to the memory control section of the main memory 23.

An output from the AND circuit 39 is delivered to a one-bit delay circuit 46 formed of a delayed flip-flop circuit in which information is stored upon receipt of a clock pulse $\phi_1$ through an OR circuit 45 and from which information is read out upon receipt of a clock pulse $\phi_2$ through said OR circuit 45. An output from the AND circuit 39 is supplied to an AND circuit 48 which gives forth an output to the OR circuit 45 through an inverter 47. An output from the delay circuit 46 is supplied to the decoder 28 as an instruction to read out a specified bit signal, and also to the AND circuit 48. When the delay circuit 46 is supplied with a bit signal coded as "1", an output from said delay circuit 46 is made to circulate through an AND circuit 48 and OR circuit 45 connectively constituting the memory device 30.

When the last two "10" of the bits designating a word-positioning code indicate that a word following said word positioning code has a character bit number of 6, then the delay circuit 46 issues an output, which is supplied to the decoder 28 as an instruction to read out a six-bit signal. Said output from the delay circuit 46 is supplied to the counter circuit 31 as an instruction to count six bits. Where the last two bits "01" of a word positioning code indicate that a word following said word positioning code has a character bit number of 4, then the AND circuit 41 produces an output, which closes the gate of the AND circuit 48 included in the memory data circulation circuit of the delay circuit 46, preventing said delay circuit 46 from producing any output. Accordingly, the decoder 28 is supplied with an instruction to read out four bits, and the counter circuit 31 is also supplied through an inverter 49 an instruction to count four bits.

The counter circuit 31 which receives from the memory device 30 an instruction count four or six bits comprises a first four-scale counter 31a consisting of, for example, from one-bit delay circuits each operated by clock pulse $\phi_1, \phi_2$ and a second two-scale counter 31b disposed in series to the first four-scale counter 31a. Information stored in the counter 31 is shifted according to the type of clock pulse received. The output terminal of the second two-scale counter 31b is connected to one of the gates of an AND circuit 50 (FIG. 7), the other gate of which is opened by an output from the delay circuit 46 the output terminal of the four-scale counter 31a is connected to one of the gates of an AND circuit 51 (FIG. 7), the other gate of which is opened by an output from an inverter 49. Outputs from the AND circuits 50, 51 are supplied to the input terminal of the four-scale counter 31a through an OR circuit 52. When the corresponding gate of the AND circuit 50 is opened, a six-bit signal circulation circuit is formed. When the corresponding gate of the AND circuit 51 is opened, a four-bit signal circulation circuit is provided. Whether the counter 31a is instructed to count four or six bits, a carry signal is readout from the first digit position of said counter 31a. This carry signal is conducted to one gate of the AND circuit 32 having the other gate which is supplied with a clock pulse $\phi_1$, and also to the AND circuits 39, 41 as a gating signal. An output from the delay circuit 46 is delivered as a gating signal to the AND circuit 35 included in the output buffer register 25, and an output from the inverter 49 is conducted similarly as a gating signal to the AND circuit 37 included in said output buffer register 25.

Where, in the information transmission apparatus arranged as described above, a six-bit word positioning code succeeding to a six-bit word is coded as "111101" so as to indicate that a word following said word-positioning code has a character bit number of 4, then the delay circuits 33a to 33e collectively present a content of "11101" in the timing in which the counter circuit 31 gives forth a carry signal. Thus, the character bit number of a word supplied at this time is designated as "1", causing the AND circuit 42 and inverter 40 to give forth an output. Upon receipt of a carry signal from the counter circuit 31, therefore, the AND circuit 41 also generates an output. Namely, a stop command corresponding to the detection of a word-positioning code is issued through the OR circuit 44. Upon receipt of an output from the AND circuit 41, the inverter 47 ceases to produce any output. As the result, the gate of the AND circuit 48 is closed, preventing the delay circuit 46 from giving forth any output. The gate of the AND circuit 51 is opened by an output from the inverter 49. Namely, the input and output terminals of the four-scale counter 31a of the counter circuit 31 are connected together to form a circulation passage, thereby causing said counter circuit 31 to be operated at a four-scale. When supplied with a word following a word-positioning code and having a character bit number of 4, the output buffer register 25 issues a carry signal to operate the memory unit 26. A six-bit word-positioning code (coded as "111101") preceding said four-bit word and previously stored in the output buffer register 25 is detected by the word positioning code-detecting circuit 13 and stored in the memory unit 26 in response to an output from the AND circuit 32 and then carried to the decoder 28 to be read out therefrom as a word-positioning code.

Where the last two "01" of the bits designating a word-positioning code indicate that a word following said positioning code has a character bit number of 4, the inverter 49 included in the memory device 30 gives forth an output, and the counter circuit 31 counts four bits. As the result, the corresponding gate of the AND circuit 37 is opened and the corresponding gate of the AND circuit 35 is closed. A word following the above-mentioned word-positioning code bypasses the delay circuits 33a, 33b, of the output buffer register 25 and is brought to the delay circuit 33c, causing the output buffer register 25 to produce four bits for each character. When the four-bit signal of a character is received, a carry signal delivered from the counter circuit 31 causes the bit signals stored in the output buffer register 25 to be sent forth to the decoder 28, from which four bits are read out for each character.

Where the supply of a word having a character bit number of 4 is brought to an end and the succeeding four-bit word-positioning code is coded as "1110" to indicate that a word following said word-positioning code has a character bit number of 6, then the inverter 49 generates an output. Since the last two of the above-mentioned four-bits of the word-positioning code are coded as "10", the inverter 38 gives forth an output, and as the result, an output from the AND circuit 39 is written in the delay circuit 46. Since, at this time, the AND circuit 41 does not produce any output, the gate of the AND circuit 48 is opened by an output from the inverter 47. The memory device 30 is kept in stored state in which an output is ready to be read out. Consequently, the corresponding gate of the AND circuit 50 included in the counter circuit 31 is opened to cause said counter circuit 31 to count six bits. At this time, the corresponding gate of the AND circuit 35 is opened by an output from the delay circuit 46. Accordingly, the output buffer register 25 produces six bits.

The foregoing description refers to the embodiment in which the respective characters of each word were designated by four or six bits. However, the character bit number may be freely chosen. Obviously, the character bit number need not be limited to two forms, but various bit number may be adopted according to the content of each word. The information input device applies tabsetting in defining the character bit number of each word. However, it is possible to adopt any other input means such as that by which the content of each word is automatically judged, thereby defining that portion (for example, the last two) of the temporarily stored bits representing a word-positioning code which is used to indicate the character bit number of a word following said word-positioning code. This invention is applicable not only to a manually operative information input device, but also to any other input device, for example, a perforated tape.

What is claimed is:

1. An information transmission-controlling device comprising:

main memory means for storing a series of words, each word comprising a plurality of binary-coded characters;

information input means coupled to the main memory means for supplying the main memory means with a numeral-type word, a letter-type word having a larger character bit number than the numeral-type word and a word-positioning code interposed between any adjacent two words;

means for generating character bit number-indicating signals corresponding to the number of bits which constitute the characters of each word;

character bit number memory means coupled to said generating means for storing character bit number-indicating signals distinguishing between the number of character bits constituting each letter type word and the number of character bits constituting each numeral type word, in a programmed order identical with the order in which the letter type and numeral type words have been delivered from the information input means;

means coupled to said information input means and to said character bit number memory means for detecting a word-positioning code delivered from the information input means and for supplying, upon detection of a word-positioning code, to said character bit number memory means a shift command for causing character bit number-indicating signals to be read out from said character bit number memory means one by one in said programmed order;

circuit means coupled to said character bit number memory means for determining the character bit number of each word being delivered to said main memory means from the information input means, upon receipt of a character bit number-indicating signal read out from said character bit number memory means;

a source of an output command signal coupled to said main memory;

means coupled to said main memory means and to said character bit number memory means for detecting a word-positioning code delivered from said main memory means upon receipt by said main memory of an output command signal, and for supplying the same to said character bit number memory means as a shift command so that character bit number-indicating signals are read out from said character bit number memory means one by one in said programmed order; and means coupled to said main memory means for determining the character bit number of each word being delivered from said character bit number memory means and to be transmitted to a printing apparatus, upon receipt of a character bit number-indicating signal read out from said character bit number memory means.

2. An information transmission-controlling device according to claim 1, wherein said character bit number memory means includes a static shift register for storing binary-coded signals of two layers as character bit number-indicating signals distinguishing between each letter type word and each numeral type word in a programmed order identical with the order in which the letter type and numeral type words have been delivered from the information input means, said static shift register being shifted upon receipt of a word-positioning code from the information input means which serves as a shift command for said static shift register so as to supply the character bit number-indicating signals one after another to said circuit means for determining the character bit number of each word being delivered from the information input means.

3. An information transmission-controlling device according to claim 2 wherein said circuit means for determining the character bit number of each word from the information input means comprises counter means coupled to said character bit number memory means and adapted to advance by at least one count in response to each of the character bit number indicating signals delivered from said character bit number memory means in said programmed order, upon counting up a certain value specific to the binary signal which represents the character bit number-indicating signal, said counter means providing count outputs of at least two different types; and a logic circuit means coupled to said counter means for determining, as a function of count outputs of two different types from said counter means, the character bit number of each of the letter-type and numeral-type words delivered from the information input means and for serially storing the letter type and numeral type words into said main memory means in the same order as the words have been delivered from the information input means.

4. An information transmission-controlling device comprising:
  main memory means for storing a series of words, each word including a plurality of binary-coded characters;
  information input means coupled to the main memory means for supplying the main memory means with a numeral-type word, a letter-type word having a larger character bit number than the numeral-type word and a word positioning code interposed between any two adjacent words in the form of specifically-binary coded signal, respectively, said word-positioning code having the same number of bits as the number of character bits constituting the immediately preceding word to be fed out and of a binary-coded character bit number of the word following said word to be fed out;
  means coupled to the information input means for firstly detecting a word-positioning code which has been delivered from the information input means and the bit configuration of which differs according to the character bit number of the word immediately following the word-positioning code, and for generating and temporarily storing a detection output;
  circuit means coupled to the means for firstly detecting a word positioning code for determining the character bit number of each word being delivered from the information input means to the main memory means, upon receipt of a detection output from the means for detecting a word-positioning code, which has been stored temporarily;
  a source of an output command signal coupled to said main memory;
  means coupled to the main memory for secondly detecting a word-positioning code delivered from the main memory means upon receipt by said main memory of an output command signal and for generating and temporarily storing a character bit number-indicating signal; and
  circuit means coupled to the main memory and to the means for secondly detecting a word-positioning code for determining the character bit number of each word being delivered from the main memory to a printing apparatus, upon receipt of a character bit number-indicating signal, which has been stored temporarily, when said means for secondly detecting a word-positioning code generates a character bit number-indicating signal.

5. An information transmission-controlling device according to claim 4, wherein said circuit means for determining the character bit number of each word comprises further memory means coupled to the means for firstly detecting a word-positioning code and adapted to store a detection output from said detecting means, said detection output corresponding to a word-positioning code whose bit configuration is a function of the number of character bits constituting the letter type or numerical type word immediately following the word-positioning code; counter means coupled to said further memory means and adapted to advance by at least one count upon counting up a certain value corresponding to each of outputs read out from said further memory means in the same order as the outputs have been stored in said further memory means, in response to a detection output from said means for firstly detecting a word-positioning code, said counter means providing counter outputs of at least two different types; and a logic circuit means coupled to the counter means and adapted to determine, as a function of count outputs of two different types from the counter means, the character bit number of each of the letter-type and numeral-type words delivered from the information input means and to serially store the letter-type and numeral-type words into the main memory means in the same order as the words have been delivered from the information input means.

* * * * *